United States Patent [19]

Bartholomew

[11] Patent Number: 5,779,279
[45] Date of Patent: Jul. 14, 1998

[54] CONNECTION VERIFICATION AND SECONDARY LATCH DEVICE

[75] Inventor: Donald D. Bartholomew, Mt. Clemens, Mich.

[73] Assignee: Proprietary Technology, Inc., Bloomfield Hills, Mich.

[21] Appl. No.: 737,870

[22] PCT Filed: May 24, 1994

[86] PCT No.: PCT/US94/05886

§ 371 Date: Nov. 19, 1996

§ 102(e) Date: Nov. 19, 1996

[87] PCT Pub. No.: WO95/32382

PCT Pub. Date: Nov. 30, 1995

[51] Int. Cl.$^6$ ............................................. F16L 37/084
[52] U.S. Cl. ............................. 285/93; 285/81; 285/319
[58] Field of Search ............................. 285/81, 93, 319, 285/921

[56] References Cited

U.S. PATENT DOCUMENTS

| | | |
|---|---|---|
| 3,453,005 | 7/1969 | Foults . |
| 3,929,357 | 12/1975 | DeVincent et al. . |
| 4,035,005 | 7/1977 | DeVincent et al. . |
| 4,036,515 | 7/1977 | Karcher et al. . |
| 4,610,468 | 9/1986 | Wood . |
| 4,915,420 | 4/1990 | Washizu . |
| 4,969,667 | 11/1990 | Sauer . |
| 4,993,756 | 2/1991 | Bechu . |
| 5,040,829 | 8/1991 | Sauer . |
| 5,044,675 | 9/1991 | Sauer . |
| 5,048,874 | 9/1991 | Ohlsson . |
| 5,131,687 | 7/1992 | Marchou . |
| 5,141,264 | 8/1992 | Usui . |
| 5,178,424 | 1/1993 | Klinger . |
| 5,354,102 | 10/1994 | Carman . |
| 5,395,140 | 3/1995 | Wiethorn ..................... 285/93 |

FOREIGN PATENT DOCUMENTS 2291438   7/1976   France .

*Primary Examiner*—Eric K. Nicholson
*Attorney, Agent, or Firm*—Harness, Dickey & Pierce, P.L.C.

[57] ABSTRACT

The present invention relates to connector assemblies (10, 110, 210) including a secondary latching mechanism (48, 148, 220) which engages a second annular projections (26, 126, 226) provided on a tubular conduit (12, 112, 212). The latching mechanisms (48, 148, 220) extend outside of the female housing (14, 114, 214) which receives the conduit thus allowing for an inspection of the assembly to insure that a complete connection has been accomplished.

21 Claims, 3 Drawing Sheets

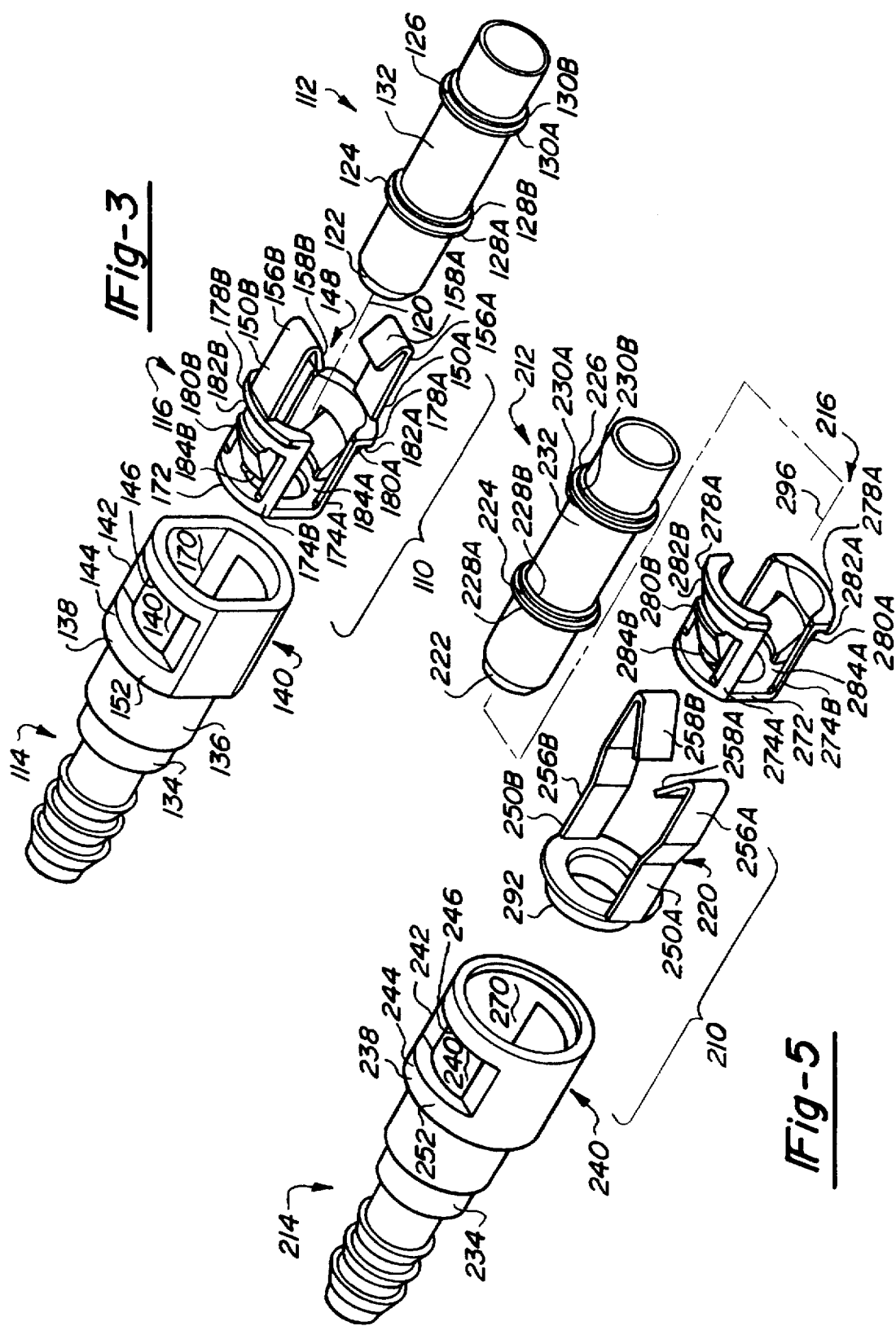

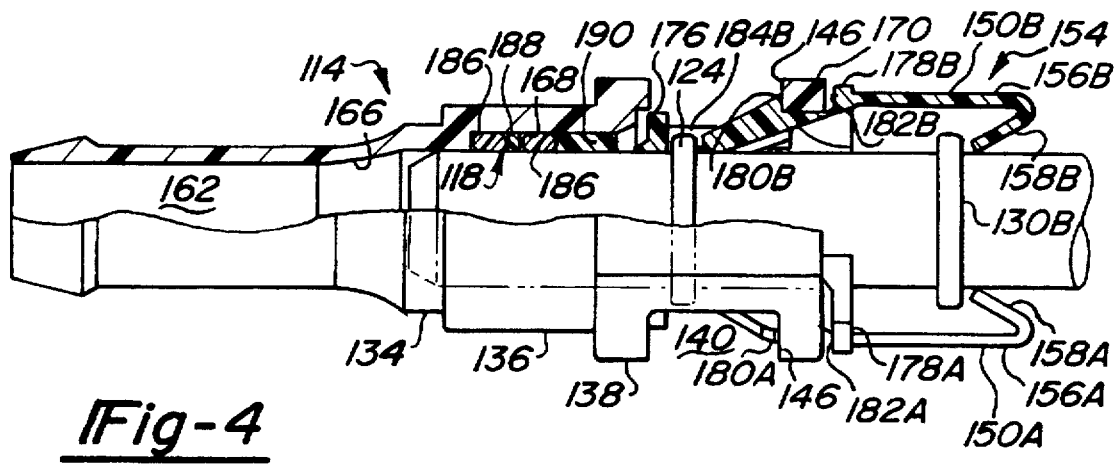
IFig-4
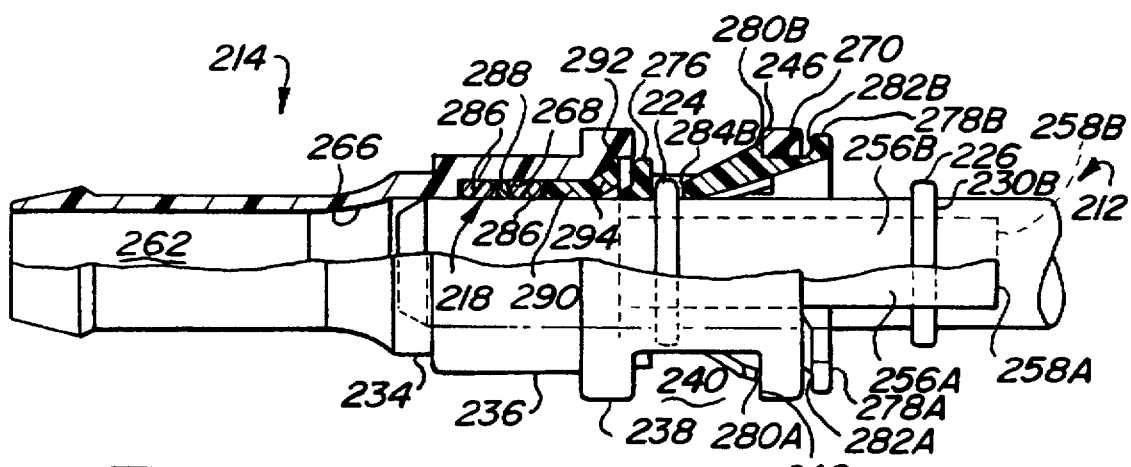
IFig-6

CONNECTION VERIFICATION AND SECONDARY LATCH DEVICE

BACKGROUND OF THE INVENTION

The present inventive relates to a connector assembly for fluid conveying conduits and, more particularly, to a connection assembly between the male conduit and female housing elements of the connector assembly.

In the automotive industry, as well as for many other industries, the need always exists for low cost, reliable, and easy to assemble components. This need is especially apparent with respect to providing a connection between fluid conveying conduits, such as fuel or refrigerant lines. Older threaded connectors typically require substantial assembly time for screwing on a cap to a fitting and tightening the cap down to the proper torque needed to provide a fluid tight seal. Further, an inventory would have to be maintained to keep track of the number of caps and fittings and any liners for other components that may be necessary. Also, re-tightening of the caps may be required to maintain the seal after the automobile or other system has been put into use.

Recently therefore there has been a move towards utilizing connector assemblies and particularly quick connector assemblies wherein a threaded connection is no longer needed to connect the male conduit and female housing elements. Quick connector assemblies typically include a female housing, a male conduit and some type of retainer for securing the male conduit within the female housing. One problem with many of the known quick connector assemblies is the failure to provide a check mechanism to insure that the male conduit is securely connected to the female housing. Further, for those connector assemblies including some type of check mechanism the mechanism is for verifying that the full connection between the male conduit and female housing has been accomplished often, at least partially, disposed within the female housing which precludes a clear visual inspection of the quick connector assembly to confirm that complete coupling between the male conduit and the female housing has occurred.

The trend therefore has recently been to develop coupling verification assemblies which include exposed means for verifying that a complete connection between the tubular conduit and housing has been accomplished. One problem with such assemblies is that the coupling verification means typically include a boot, latch, collar, pin or other such structure which must be physically manipulated by the operator to insure that complete connection between the male conduit and female housing has been accomplished. This adds unnecessarily to assembly time thus limiting productively.

Accordingly, it is the primary object of the present invention to provide an improved connector assembly for providing a quick connection between fluid conveying conduits wherein the latching mechanism serves to verify that a proper connection has been made between the male tubular conduit and the female housing. Further, the connector assembly and latching retainer of the present invention provide both visual and mechanical means for verifying that a complete connection has been made without requiring an operator to manipulate any portion of the assembly once the conduit and housing have been joined.

Yet another object is to provide a secondary coupling between the tubular conduit and the housing.

Still another objection of the present invention is to provide an easily connectable assembly, which is inexpensive to manufacture, durable and may be employed to join dissimilar electrically conductive materials that would otherwise be subject to galvanic corrosion.

To achieve the foregoing objects, the present invention provides a connector assembly which generally comprises a male tubular conduit, a female housing, sealing means, latching means and under at least one embodiment retainer means. The tubular conduit is adapted to convey fluid and is formed with a first annular projection disposed a predetermined distance from the end of the conduit to be connected and a second annular projection spaced apart from the first annular projection also disposed a predetermined distance from the end to be connected. The housing is formed with an axial bore for receiving the conduit at a first end and for providing a fluid path at a second end. The housing includes an enlarged diameter portion and a coupling portion extending from a first end of the enlarged diameter portion. Sealing means are disposed within the axial bore of the housing for providing a fluid tight seal between confronting portions of the conduit and housing. Under at least one embodiment retainer means are provided and are adapted to be disposed generally over the first end of the tubular conduit. The retainer means which are disposed within the axial bore of the housing upon insertion of the tubular conduit include at least one deformable leg having a blocking portion which seats against the first annular projection of the tubular conduit. The latching means include a plurality of extending hooks, preferably two in number, having incurved end portions. Depending upon the embodiment, the latching means extend from the housing, extend from the retainer means or is a separate element. Regardless of the embodiment, the incurved ends of the extending hooks engage the second annular projection of the tubular conduit to provide a secondary latching means.

Additional objects and advantages of the present invention will become apparent from a reading of the detailed description of the preferred embodiments which makes reference to the following set of drawings in which;

BRIEF DESCRIPTION OF THE DRAWINGS

FIG. 3 is a blown out perspective view of a second connector assembly embodiment according to the teachings of the present invention;

FIG. 4 is a side elevational view, partially in cross-section of the embodiment of FIG. 3;

FIG. 5 is a blown out perspective view of a third embodiment according to the teachings of the present invention; and FIG. 6 is a side elevational view of FIG. 5.

DETAILED DESCRIPTION OF THE PREFERRED EMBODIMENT

Figure 1:
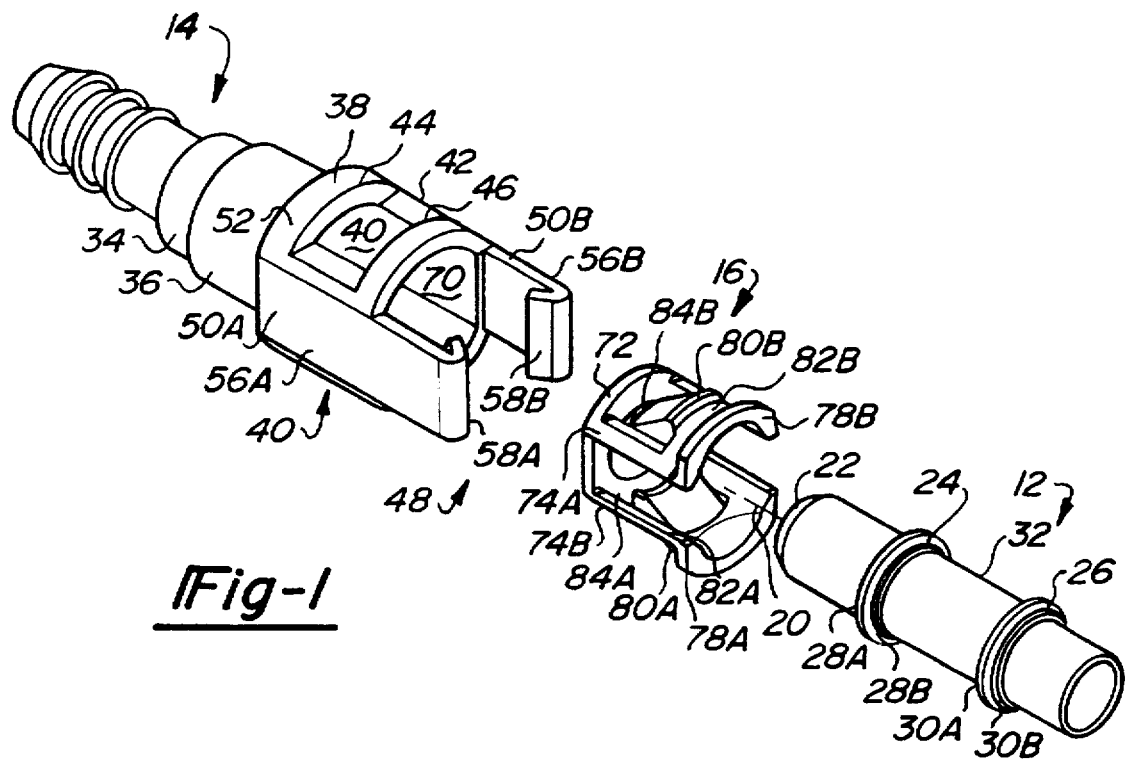
FIG. 1 is a blown out perspective view of a first connector assembly embodiment according to the teachings of the present invention.
Figure 2:
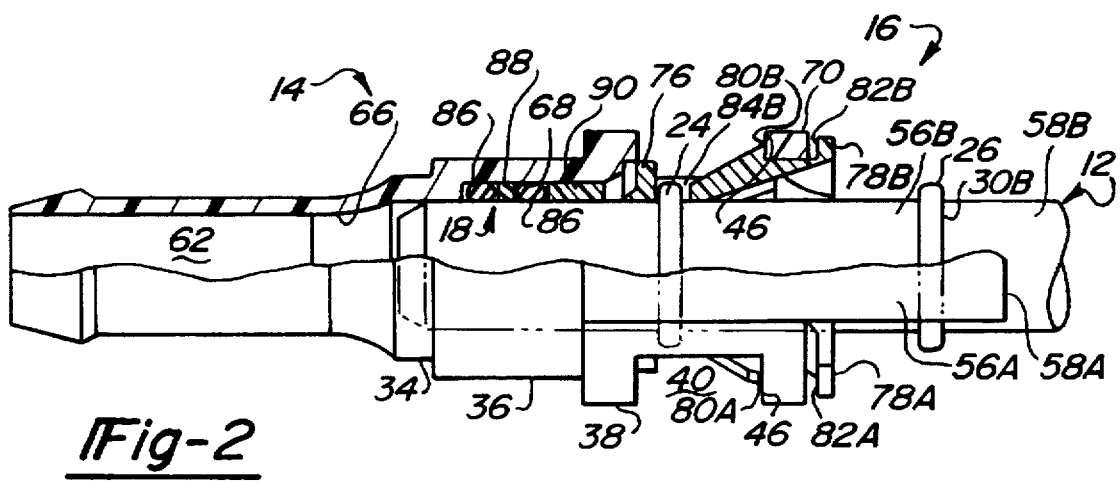
FIG. 2 is a side elevational view, partially in cross-section, of the connector assembly of FIG. 1.

Referring to FIGS. 1 and 2, a first connector assembly embodiment 10 according to the teachings of the present invention is shown. The connector assembly 10 is generally comprised of a tubular conduit 12 adapted to convey fluid, a housing 14, a retainer element 16, and sealing means 18 as shown in FIG. 2. The conduit 12 is provided with a first outwardly projecting annular portion 24 displaced from a beveled connecting end 22 and a second annular projection 26 displaced further from the beveled connecting end 22.

The first annular projection 24 is formed with first and second blocking walls 28A and 28B, respectively, disposed substantially transversely or perpendicularly to the central longitudinal axis shown as dot and dash line 20. Likewise, the second annular projection 26 is also formed with first and second blocking walls 30A and 30B, respectively, disposed substantially transversely or perpendicular to the central longitudinal axis 20. Typically, the conduit 12 includes an outer diameter 32 which is substantially round and consistent in the cross-sectional size along the length of the connecting end of the conduit.

The housing 14 may include multiple sections, but typically includes an enlarged diameter portion 36 and a reduced diameter portion 34. Extending from the enlarged diameter portion 36 is a coupling portion 38 having a substantially round or oval shape in cross-section. The coupling portion 38 is provided with a pair of windows 40 having an overall rectangular shape including shorter ends 42 and longer sides 44. The sides 44 include substantially flat blocking walls 46 which assist in maintaining the retainer element 16 within the housing as will be described in greater detail below.

The housing 14 also includes secondary latching means 48 comprised of first and second latching hooks 50A and 50B, respectively, extending from the outer diameter 52 of the coupling portion 38. The first and second latching hooks 50A and 50B include elongated legs 56A and 56B having incurved end portion 58A and 58B for engaging the second annular projecting portion 26 of the tubular conduit 12. Preferably, the first and second latching hooks 50A and 50B are disposed parallel and diametrically along opposite sides of the coupling portion 38 of the housing 14.

Internally, the housing 14 includes an axial bore 62 for receiving the sealing means and the first end of the tubular conduit 14. The axial bore 62 includes bore sections 66, 68, and 70 which occur correspondingly within the reduced diameter portion 34, large diameter portion 36 and the coupling portion 38 of the housing 14, respectively.

The retainer element 16 is made from a relatively resilient material, such as metal or plastic, and includes a pair of elongated legs 74A and 74B normally extending substantially perpendicularly from opposite ends of the collar 72 along the same side. The collar 72 is preferably formed with a beveled downwardly tapering lip 76 which extends away from the deformable legs. Both legs 74A and 74B include outwardly projecting flanges 78A and 78B disposed along the distal portion of the leg and tabs 80A and 80B extending outwardly at approximately the center of each leg. Located between the tab portions and the flanges are grooves 82A and 82B, respectively. Also provided on each of the legs 74A and 74B is an aperture 84A and 84B located between the collar 72 and the respective tabs for hosting a portion of the first annular projection. The sealing means 18 may include a variety of different arrangements known in the art. Typically, however, the means include a pair of elastomeric O-rings 86, a spacer 88 and a bushing 90.

The operational aspects in assembling of the connector assembly embodiment 10 will now be described in greater detail. To assemble the connector assembly 10 as demonstrated in FIG. 2. initially the sealing means 18 are disposed within axial bore portion 68. The retainer element 16 is then either inserted into the bore portion 70 of the coupling portion 38 or over the end 22 of the tubular conduit. The end 22 of the tubular conduit 12 is then inserted into the housing 14 until the beveled end is disposed within bore portion 66. The retainer element 16 is then connected to the housing 14 within the coupling portion 38 wherein the tabs 80A and 80B engage the blocking walls 46 of the windows 40. The first annular projection 24 extends into the apertures 84A and 84B of the retainer element to primarily lock the tubular conduit within the housing. Portions 58A and 58B lock in on area 30B of the second tube bead 26.

Referring to FIGS. 3 and 4, a second connector assembly embodiment 110 is shown. The connector assembly 110 is generally comprised of a tubular conduit 112 adapted to convey fluid, a housing 114, a retainer element 116, and sealing means 118 as shown more clearly in FIG. 4. The conduit 112 is provided with a first outwardly projecting annular portion 124 displaced from a beveled connecting end 122 and a second annular projection 126 displaced further from the beveled connecting end 122. The first annular projection 124 is formed with first and second blocking walls 128A and 128B, respectively, disposed substantially transversely or perpendicularly to the central longitudinal axis shown as dot and dash line 120. Likewise, the second annular projection 126 is also formed with first and second blocking walls 130A and 130B, respectively, disposed substantially transversely or perpendicular to the central longitudinal axis 120. Typically, the conduit 112 includes and outer diameter 132 which is substantially round and consistent in cross-sectional size along the length of the connecting end 122.

The housing 114 may include multiple sections, but typically includes an enlarged diameter portion 136 and a reduced diameter portion 134. Extending from the enlarged diameter portion 136 is a coupling portion 138 having a substantially round or oval shape in cross-section. The coupling portion 138 is provided with a pair of windows 140 having an overall rectangular shape including shorter ends 142 and longer sides 144. The sides 144 include substantially flat blocking walls 146 which assist in maintaining the retainer element 116 within the housing as will be described in greater detail below.

Internally, the housing 114 includes an axial bore 162 for receiving the sealing means 118 and the first end of the tubular conduit 114. The axial bore 162 includes bore sections 166, 168, and 170 which occur correspondingly within the reduced diameter portion 134, large diameter portion 136 and the coupling portion 138, respectively.

The retainer element 116 is made from a relatively resilient material, such as metal or plastic, and includes a pair of elongated legs 174A and 174B normally extending substantially perpendicularly from opposite ends of a collar 172 along the same side. The collar 172 is preferably formed with a beveled downwardly tapering lip 176 which extends away from the deformable legs 174A and 174B. Each leg 174B includes an outwardly projecting flange 178A and 178B disposed at approximately the center of each leg and tab portions 180A and 180B extending more proximate to the collar 172. Located between the tab portions 180A and 180B and the flanges 178A and 178B are grooves 182A and 182B. The legs 174A and 174B are also provided with an aperture 184A and 184B, respectively, provided between the collar and the tabs for receiving a portion of the first annular projection.

Extending linearly from each of the elongated legs 174A and 174B beyond the flanges and away from the collar 172 are the secondary latching means 154. Again, the secondary latching means are comprised of first and second latching hooks 150A and 150B. The first latching hook 150A is an extension of the first deformable leg 174A and a second latching hook 150B is an extension of the second deformable leg 174B of the retainer element 116. Both the first latching hook 150A and the second latching hook 150B include elongated portions 156A 156B and incurved ends 158A and 158B, respectively. The incurved ends serve to engage the second annular projection 126 of the tubular conduit upon complete insertion into the housing.

The sealing means 118 may include a variety of different arrangements known in the art. Typically, however, the means include a pair of elastomeric O-rings 186, a spacer 188 for separating the O-rings and an annular bushing 190.

The operational aspects and assembly of the connector assembly embodiment 110 will now be described in greater detail. Initially, the sealing means 118 are disposed within the axial bore portion 168 as shown in FIG. 4. The retainer element 116 with integral latching means 148 is then either inserted directly into the housing or positioned over the end of the tubular conduit and inserted along with the end 122 of the conduit 112 into the axial bore of the housing.

As the tubular conduit 112 is inserted into the housing 114 the latching hooks 150A and 150B are spread apart by the second annular projection 126 until the second annular projection 126 clears the incurved ends 158A and 158B of the elongated legs. Once the annular projection 126 has cleared the incurved ends 158A and 158B the latching hooks 150A and 150B resume their normal position such that the incurved ends engage the blocking wall 130B of the second annular projection 126. In this manner, secondary latching means 148 are provided and an individual can visually inspect the connector assembly 110 to insure that a complete connection has been accomplished.

Referring to FIGS. 5 and 6, a third connector assembly embodiment 210 is shown. The connector assembly 210 includes the tubular conduit 212 adapted to convey fluid, a housing 214, a retainer element 216, sealing means 218 and a secondary latching mechanism 220.

The conduit 212 is again provided with a first outwardly projecting annular portion 224 displaced from a beveled connecting end 222 and a second annular projection 226 displaced further from the beveled connecting end 222. The first annular projection 224 is formed with first and second blocking wall portions 228A and 228B, respectively, disposed substantially transversely or perpendicularly to the central longitudinal axis. Likewise, the second annular projection 226 is also formed with first and second blocking wall portions 230A and 230B, respectively, disposed substantially transversely or perpendicular to the central longitudinal axis shown as dot and dash line 296. Typically, the conduit 212 includes an outer diameter 232 which is substantially round and consistent in the cross-sectional size along the length of the connecting end of the conduit.

The housing 214 may include multiple sections, but typically includes an enlarged diameter portion 236 and a reduced diameter portion 234. Extending from the enlarged diameter portion 236 is a coupling portion 238 having a substantially round or oval shape in cross-section. The coupling portion 238 is provided with a pair of windows 240 having an overall rectangular shape including shorter ends 242 and longer sides 244. The sides 244 include substantially flat blocking walls 246 which assist in maintaining the retainer element 216 within the housing as will be described in greater detail below.

Internally, the housing 214 includes an axial bore 262 for receiving the sealing means and the first end of the tubular conduit 14. The axial bore 262 includes bore sections 266, 268, and 270 which occur correspondingly within the reduced diameter portion 234, large diameter portion 236 and the coupling portion 238 of the housing 214, respectively.

The retainer element 216 is made from a relatively resilient material, such as metal or plastic, and includes a pair of elongated legs 274A and 274B normally extending substantially perpendicularly from opposite sides of a collar 272. The collar 272 is preferably formed with a beveled downwardly tapering lip 276 which extends away from the deformable legs. Both legs 274A and 274B include outwardly projecting flanges 278A and 278B disposed along the distal portion of the leg and tab portions 280A and 280B extending at approximately the center of each leg. Located between the tab portions and the flanges are grooves 282A and 282B, respectively.

The secondary latching mechanism 220 includes an annular ring 292 having a downwardly tapered lip 294 and a pair of hook members 250A and 250B extending substantially perpendicularly from the ring 292. The hook members 250A and 250B which preferably are formed along opposite ends of the ring 292 include elongated legs 256A and 256B having incurved ends 258A and 258B, respectively, which serve to engage the blocking wall 230B o the second annular projection 226 upon complete connection between the tubular conduit 212 and the female housing 214.

The sealing means 218 which are disposed within bore portion 268 may include a variety of different arrangements known in the art. Typically, however, the means include a pair of elastomeric O-rings 286, a spacer 288 for separating the O-rings and annular bushing 290.

Generally, the sealing means 218 are disposed within the axial bore portion 268 as shown in FIG. 6. The secondary latching mechanism 220 is then positioned within the bore portion 270 such that the tapered lip 294 of the collar 292 engages the frustoconical portion of the bore. As shown in FIGS. 5 and 6 the extending legs 256A and 256B are sufficiently long so as to extend from the housing 214 when the collar is fully inserted into the housing.

The retainer element 216 is then either inserted directly into the bore portion 270 or positioned over the end 222 of the conduit 212. Regardless of which way the retainer is inserted as the tubular conduit 212 is inserted into the housing 214 the conduit is inserted until the leading end 222 seats within the bore 266. As the tubular conduit is being inserted the second annular projection pushes the legs 256A and 256B of the latching mechanism 220 apart as it passes the incurved ends 258A and 258B, respectively. Once the conduit 212 is fully inserted such that the annular projection 226 slides past the incurved ends 258A and 258B, legs 256A and 256B flex back to their normal position such that incurved end 256A and 256B engage the blocking walls 230B of the second annular projection 226. In this manner the secondary latching mechanism 220 provides both the secondary latch and means for visually inspecting to insure that a complete connection between the tubular conduit 212 and the housing 214 has been accomplished.

While the above description constitutes the preferred embodiment of the present invention, it will be appreciated that the invention is susceptible to modification, variation and change without departing from the proper scope and entire meaning of the accompanying claims.

What is claimed is:

1. A connector assembly, comprising:
   a tubular conduit including a first end having first and second annular projections disposed a predetermined distance from said first end;
   a retainer element including primary latching means releasably engageable with the first annular projection;
   means for sealing the connector assembly; and a housing for receiving the first end of the tubular conduit, said housing including secondary latching means extending from the housing for maintaining a fluid conveying connection between the tubular conduit and the housing, the secondary latching means including a pair of axially formed arms having means for locking formed on the ends thereof, whereby upon fully inserting the tubular conduit within the housing, the primary latching means engage the first annular projection of the tubular conduit and the locking means of the secondary latching means engage the second annular projection of the tubular conduit.

2. The connector assembly according to claim 1, wherein said secondary latching means further comprise at least one hook member including an elongated leg and an encurved end portion.

3. The connector assembly according to claim 2, wherein said secondary latching means include first and second hook members.

4. The connector assembly according to claim 3, wherein said first and second hook members are disposed diametrically opposite each other and extend in the same direction along a first end of the housing.

5. A connector assembly, comprising:
a tubular conduit including a first end having first and second annular projections disposed a predetermined distance from said first end;
means for sealing the connector assembly;
a housing for receiving the first end of the tubular conduit, said housing including at least one blocking wall and a secondary latching means; and
a retainer element including an annular collar and at least one deformable leg for maintaining a fluid conveying connection between the tubular conduit and the housing, said at least one deformable leg including means for engaging the housing, the means for engaging the housing including a radially outwardly extending tab and a radially outwardly extending flange separated by a channel, whereby the extending tab abuttingly engages a blocking wall on the housing;
whereby upon fully inserting the tubular conduit within the housing the secondary latching means engage the second annular projection of the tubular conduit.

6. The connector assembly according to claim 5, wherein said retainer element includes a pair of selectively deformable legs extending from the annular collar.

7. The connector assembly according to claim 6, wherein said secondary latching means further comprise at least one hook member including an elongated leg and an incurved end portion.

8. The connector assembly according to claim 7, wherein said secondary latching means include first and second hook members.

9. The connector assembly according to claim 8, wherein said first and second hook members are disposed diametrically opposite each other and extend in the same direction.

10. A connector assembly comprising:
a tubular conduit including first and second annular projections disposed a predetermined distance from said first end;
a housing for receiving the first end of the tubular conduit, said housing including at least one blocking wall;
a retainer element including an annular collar and at least one selectively deformable leg extending from the annular collar for engaging the blocking wall of the housing;

means for sealing the connector assembly; and a latching mechanism including an annular ring and at least one selectively deformable hook member extending from the annular ring, said hook member including an elongated leg and an incurved end portion;
whereby upon fully inserting the tubular conduit within the housing the incurved end portion engages the second annular projection of the tubular conduit.

11. The connector assembly according to claim 10, wherein said at least one hook member includes an elongated leg and an incurved end portion.

12. The connector assembly according to claim 10, wherein said first and second hook members are disposed diametrically opposite each other and extend in the same direction from the annular ring.

13. The connector assembly according to claim 12, wherein said first and second hook members are disposed diametrically opposite each other and extend in the same direction for the annular ring.

14. A connector assembly, comprising:
a tubular conduit including a first end having first and second annular projections disposed a predetermined distance from said first end, the tubular conduit having a axis;
means for sealing the connector assembly;
a housing for receiving the first end of the tubular conduit, said housing including at least one blocking wall and a secondary latching means; and
a retainer element including:
(a) an annular collar,
(b) at least one relatively non-axially deformable portion extending between the first annular projection of the tubular conduit and the at least one blocking wall of the housing thereby maintaining the retainer element within the housing and preventing withdrawal of the tubular conduit from the housing,
(c) at least one relatively deformable portion connecting the annular collar and the non-axially deformable portion, the relatively deformable portion extending substantially parallel to the axis of the tubular conduit,
whereby upon fully inserting the tubular conduit within the housing the secondary latching means engage the second annular projection of the tubular conduit.

15. The connector assembly according to claim 14, wherein said non-axially deformable portion includes a radially outwardly extending tab which is abuttingly engageable with the blocking wall on the housing.

16. The connector assembly according to claim 14, wherein said secondary latching means further comprises at least one hook member including an elongated leg and an incurved end portion.

17. The connector assembly according to claim 14, wherein said secondary latching means includes first and second hook members.

18. The connector assembly according to claim 17, wherein said first and second hook members are disposed diametrically opposite each other and extend in the same direction.

19. A connector assembly, comprising:
a tubular conduit including a first end having first and second annular projections disposed a predetermined distance from said first end;
a retainer element including primary latching means releasably engageable with the first annular projection;
means for sealing the connector assembly; and a housing for receiving the first end of the tubular conduit, said housing including means for cooperably engaging the retainer element and secondary latching means extending from the housing for maintaining a fluid conveying connection between the tubular conduit and the housing, the secondary latching means being formed integrally with the housing as one piece, whereby upon fully inserting the tubular conduit within the housing, the primary latching means engage the first annular projection of the tubular conduit and the secondary latching means engage the second annular projection of the tubular conduit.

20. A connector assembly, comprising:

a tubular conduit including a first end having first and second annular projections disposed a predetermined distance from said first end;

a retainer element including primary latching means releasably engageable with the first annular projection, the primary latching means comprising a first pair of diametrically opposed arms;

means for sealing the connector assembly; and a housing for receiving the first end of the tubular conduit, said housing including means for cooperably engaging the retainer element and secondary latching means extending from the housing for maintaining a fluid conveying connection between the tubular conduit and the housing, the secondary latching means comprising a second pair of diametrically opposed arms, whereby upon fully inserting the tubular conduit within the housing, the primary latching means engage the first annular projection of the tubular conduit and simultaneously the secondary latching means engage the second annular projection of the tubular conduit.

21. The connector assembly according to claim 20, wherein said first pair of diametrically opposed arms is positioned at approximately a ninety-degree offset with respect to said second pair of diametrically opposed arms.

* * * * *